Feb. 17, 1931.  M. J. HUGGINS  1,792,641
LIQUID MEASURING AND INDICATING MEANS AND BEARING
Filed Sept. 3, 1925  2 Sheets-Sheet 1

INVENTOR
Marion J. Huggins
BY
John E. Seifert
HIS ATTORNEY

Feb. 17, 1931.    M. J. HUGGINS    1,792,641
LIQUID MEASURING AND INDICATING MEANS AND BEARING
Filed Sept. 3, 1925    2 Sheets-Sheet 2
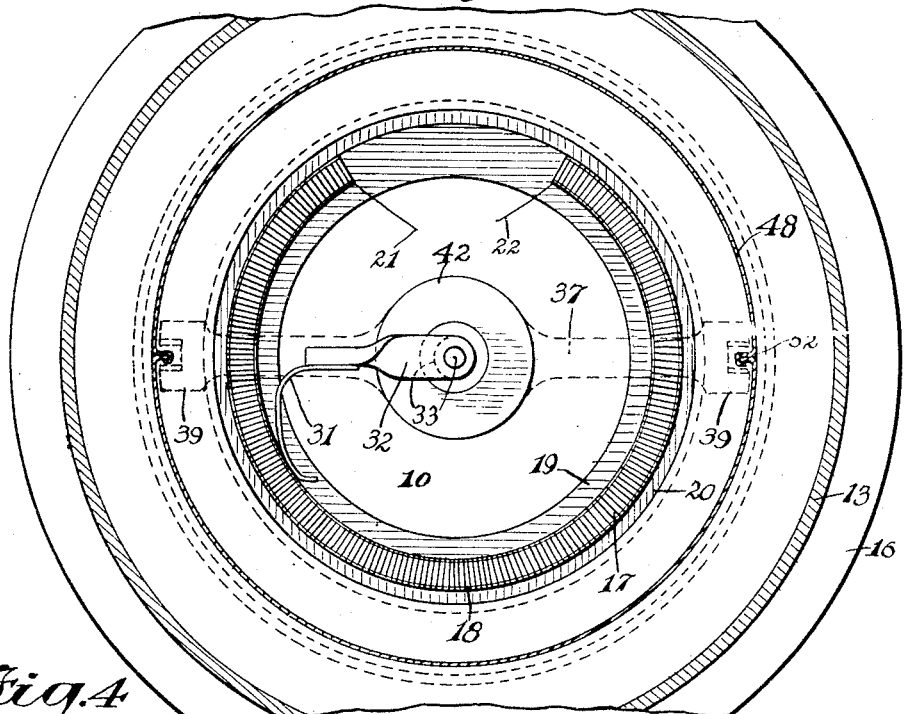
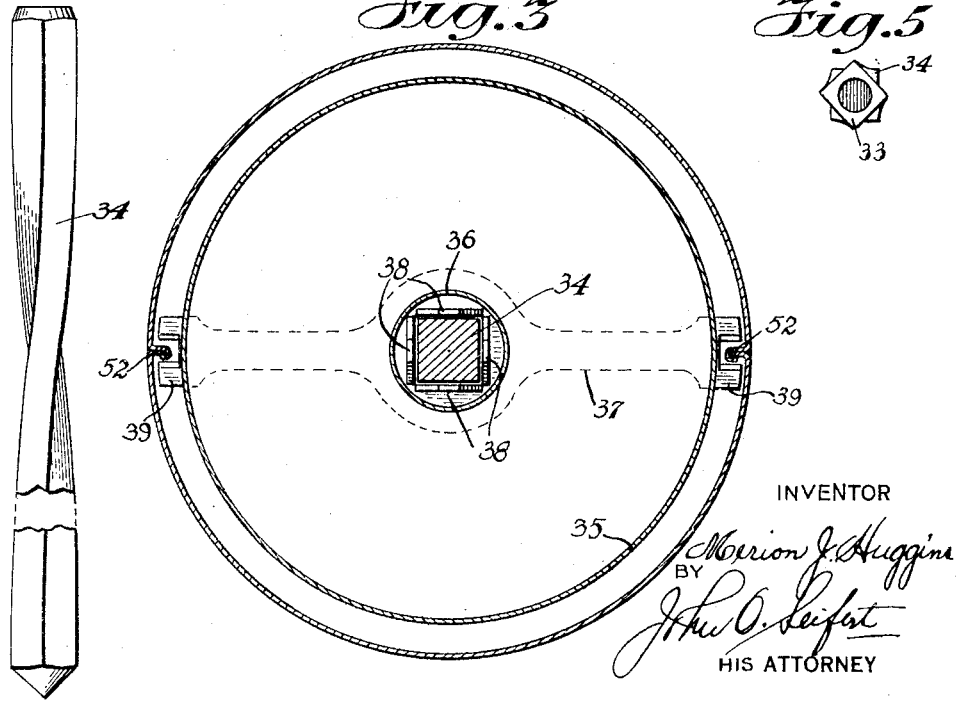
INVENTOR
Marion J. Huggins
BY
John O. Seifert
HIS ATTORNEY Patented Feb. 17, 1931

1,792,641

UNITED STATES PATENT OFFICE

MERION J. HUGGINS, OF UPPER SADDLE RIVER, NEW JERSEY, ASSIGNOR TO AUTO-METER COMPANY, INC., OF NEW YORK, N. Y., A CORPORATION OF DELAWARE

LIQUID MEASURING AND INDICATING MEANS AND BEARING

Application filed September 3, 1925. Serial No. 54,173.

This invention relates to means for electrically measuring and indicating the quantity of liquid in a tank embodying an electric indicating instrument actuated by variations produced in the current flow of an electric circuit in which the instrument is connected with a source of electricity by interposing in the circuit electric current regulating means operative to cut out of and connect into the circuit variable amounts of a resistance device, said means being actuated by means influenced by variations in the quantity of liquid in the tank to proportionally effect variations in the current flow in the circuit and thereby actuate the instrument to indicate through such variations the quantity of liquid in the tank, either by measure, such as gallons, or by the level of the liquid in the tank, and it is the primary object of the invention to provide improved constructed and arranged means for this purpose which is of simple and compact arrangement, as well as positive and efficient in use, and particularly adapted for use in connection with motor vehicles to measure and indicate the quantity of gasolene in the gasolene storage tank carried by the vehicle.

In apparatus of this character for measuring and indicating the quantity of gasolene in the gasolene tank of a motor vehicle the indicating instrument is mounted upon the instrument board of the vehicle where it may be readily observed by the driver of the vehicle, and the current regulating means in the form of a rheostat device and comprising an electric resistance element and a contact movable relative thereto to cut out of and connect into the circuit of the instrument variable amounts of the resistance element is connected in circuit with the instrument to control the same, said device being arranged in a casing which is mounted relative to and serving as a closure for an opening in a gasolene tank with a carrier for the contact rotatably mounted in a bearing in the casing to extend therethrough into the tank for the connection of means operative through the variations in the quantity of liquid in the tank to rotate said contact carrier to and fro distances proportional with the variations in the quantity or rise and fall of the level of the liquid in the tank. In the use of a commercial bearing for the contact carrier in the casing gasolene splashing against the carrier and its mounting in the bearing, due to the movement of the vehicle, will work up through the bearing and accumulate in the casing, gasolene also being highly volatile vapors thereof pass up through the bearing in the rheostat carrying casing condensing and accumulating therein, and as gasolene is a highly combustible material there is a possibility of the same becoming ignited by an electric arc which may be created by the movement of the contact relative to the resistance element and a consequent conflagration and destruction of the vehicle, and it is the principal object of the present invention to provide a mounting and bearing for the contact carrier which is impermeable to and practically hermetically sealed against the passage of the gasolene or vapors thereof.

In the use of a device of this character the rheostat or current flow regulating device is controlled by a float in the tank which rises and falls with the level of the liquid. In the operation of motor vehicles due to unevenness in the travel of the vehicle and jars the gasolene in the tank is sloshed and surged about in the tank with a constant variation in the liquid level, and as the float participates in such changes in the liquid level which changes in the position in the float are transmitted to the contact of the rheostat device with the result that it is impossible to procure a reading from the instrument as to the true condition of the quantity of liquid in the tank.

It is a further object of the invention to overcome this disadvantage for which purpose an auxiliary receptacle is provided in which the float is mounted said receptacle being constructed in a unitary structure with the rheostat carrying casing, which serves as a closure for one end of said receptacle and whereby the receptacle is suspended in the tank and adapted to be removed therefrom with said casing, the receptacle extending to the bottom of the tank and being in liquid communication with the tank through a restricted opening or openings adjacent the bottom of the tank, whereby the liquid level in the receptacle will be the mean level of the liquid in the tank and thus a reading may be obtained from the instrument which is a true and accurate indication of the quantity of liquid in the tank.

In the drawings accompanying and forming a part of this specification, I have shown an embodiment of the invention wherein Figure 1 is a sectional side elevation showing an improved construction and arrangement of the rheostat or current flow regulating device together with the mounting thereof and the connection of the float controlled actuating means therefor and the float carrying receptacle connected thereto, and showing the same mounted in relation to an opening in a tank.

Figure 2 is a cross sectional view, partly broken away, taken substantially on the line 2—2 of Figure 1 looking in the direction of the arrow.

Figure 3 is a cross sectional view taken substantially on the line 3—3 of Figure 1 looking in the direction of the arrow.

Figure 4 is a side elevation of the float operated actuator for the movable contact of the rheostat device.

Figure 5 is a cross sectional view taken on the line 5—5 of Figure 1 looking in the direction of the arrow to show the connection of the float operated actuator with the carrier for the movable contact of the rheostat device.

Similar characters of reference designate like parts throughout the different views of the drawings.

Figure 1:
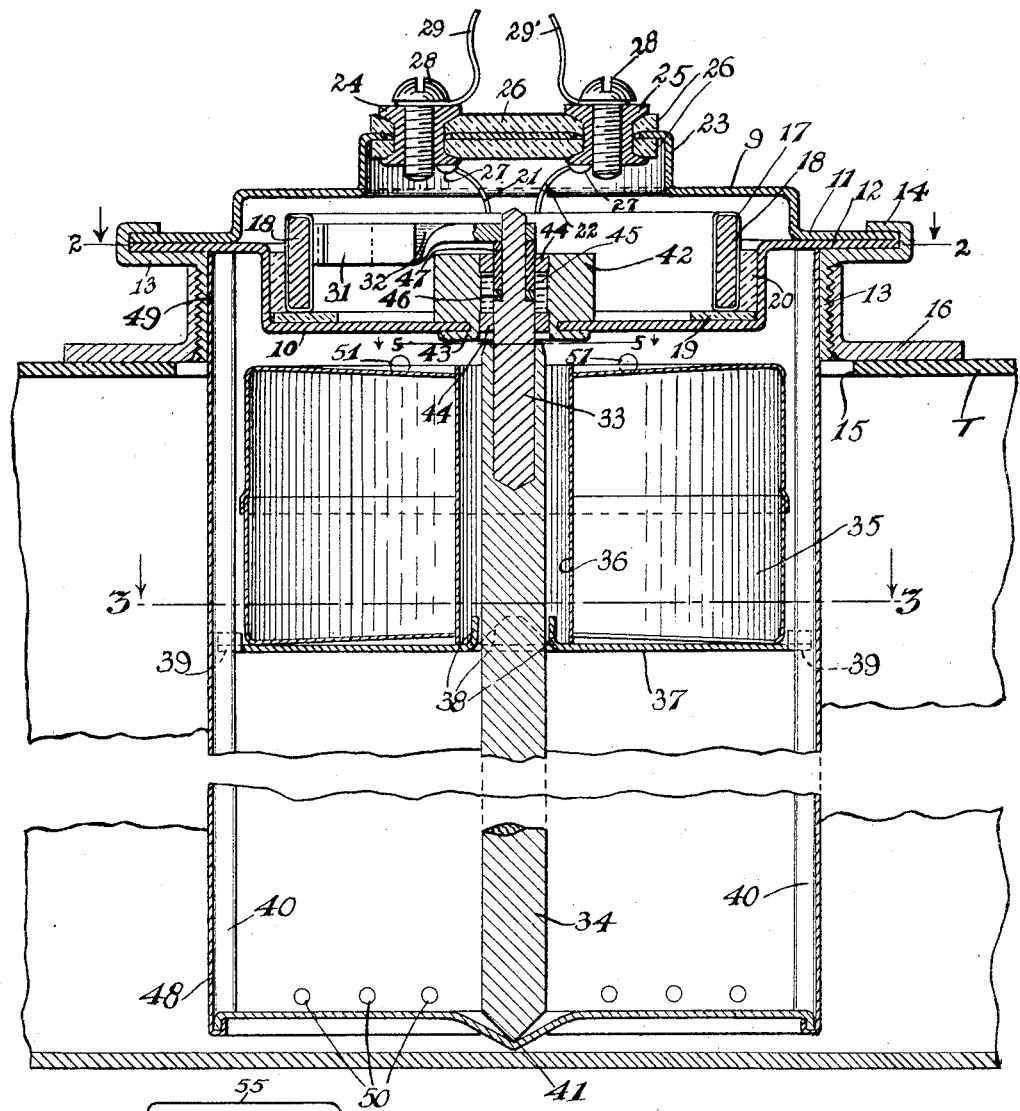

In carrying out the embodiment of the invention illustrated in the drawings there is provided a casing comprising a pair of cup shaped members 9, 10 arranged with laterally extending flanges 11, 12 secured together with the flanges in contiguous relation and the open end of the cupped members in opposed relation, as shown in Figure 1, by the bending of a flange on a ring 13 over the marginal portions of the flanges 11, 12, as shown at 14.

The ring also serves as a means for mounting the casing in relation to an opening 15 in a tank, designated in a general way by T, containing the liquid to be measured, and in motor vehicle practice constituting the gasolene carrying tank, only so much of the tank being shown as is essential to an understanding of the invention. For this purpose the ring is externally screw-threaded for connection with an internally threaded collar 16 secured to the tank, as by brazing, or otherwise, to extend about the opening 15, the casing also serving as a closure for said opening.

An electric current flow regulating or rheostat device is mounted and enclosed in the casing, comprising a coil of wire 17 wound about a dielectric member 18, said member being in the form of a bar of insulator material with the wire wound about the same when it is bent to circular form, as shown in Figure 2, and engaged within the cupped member 10 of the casing and insulated therefrom by interposing an annular plate 19 of insulating material between the bottom of said casing member and the coil, and a ring 20 of insulating material interposed between the side wall of said casing member and the coil, the resistance element being firmly retained or seated therein by the tendency of the bent bar to spring to its original straight condition.

To connect the terminals of the coil with an electric indicating instrument exterior of the casing the terminals 21, 22 of the coil are connected to contact terminals or binding posts arranged in a centrally depressed portion 23 of the casing member 9, said contact terminals comprising a pair of tubular members in the form of eyelets 24, 25 passed through openings in said casing portion 23 of enlarged diameter relative to the diameter of the eyelets and plates of insulating material 26 arranged at opposite sides of said casing portion, the openings in said insulator plates being substantially the same as that of the eyelets whereby when the eyelets are upset the wall portions of the openings in said plates will be squeezed in interposed relation to the eyelets and the wall of the openings in the recessed portion 23, as clearly shown in Figure 1, and thereby effectively insulating the eyelets from the casing. The coil terminals are electrically connected to said contact terminals as by soldering, as shown at 27. The eyelets are internally threaded for the engagement of binding screws 28 to electrically connect conductors 29, 29' for connecting the indicating instrument in circuit with the coil. To connect into and cut out of the circuit of the instrument variable amounts of the resistance element or coil, a contact making brush is provided mounted in the casing to have to and fro movement relative to the coil, said contact being connected in the circuit of the coil and instrument with a source of electricity, in motor vehicle practice comprising a storage battery, designated in a conventional manner at B in Figure 6, one terminal of which battery is grounded in the vehicle frame and electrically connecting the contact thereto by grounding the same in the vehicle frame through the tank and casing. This contact comprises a curved finger of resilient material 31 fixed to an arm 32 secured to a mounting member or stem 33 to extend laterally therefrom, said arm and stem being made of a material being a good electrical conductor, in the present instance iron, for a purpose to be hereinafter described. The stem 33 is in the nature of a mounting member for the contact or brush whereby it is journaled in a bearing or journal box carried by the casing member 10 to extend to the exterior of the casing and operatively connected to an actuator therefor in the form of a shaft 34 of square shape in cross section and twisted to give it a spiral form, as shown in Figures 4 and 5, the shaft being of a length substantially the same as the depth of the tank T and rotatably supported at its lower end.

As stated the contact is moved to and fro relative to the coil distances proportional to the variations in the quantity of liquid in the tank. For this purpose a float 35, shown as of the hollow type, is provided to rise and fall with the liquid level in the tank. The float has a hollow core or hub 36 extending therethrough for the passage of the shaft 34. To transmit the up and down movement of the float to rotary movement of the shaft and thereby revolving movement of the contact or brush 31 relative to the coil the float is coupled to the shaft by a plate 37 fixed to the float to extend diametrically across the same, said plate having a circular enlarged portion and centrally perforated for the passage of the shaft 34, the portions of the material stamped from the plate to form opening being bent or flanged outwardly to engage each side of the shaft, as shown at 38. The float is held against rotation by the bifurcated extended ends 39 of said plate engaging guide members 40 arranged diametrically opposite of the float and extended downward from the mounting ring 13. These guides may be in the form of rods, but in the present instance comprise ribs arranged on the interior of a receptacle in which the float has up and down movement and in the bottom of which receptacle the shaft 34 is mounted, as at 41, for a purpose to be hereinafter described. The twist of the shaft 34 is such that a complete up or down movement of the float will impart only a partial revolution to the shaft to move the contact or brush 31 from one terminal of the coil to the other.

As stated, it is an object of the invention to provide an improved mounting for a carrier for the contact or brush 31 to prevent gasolene, or the vapors thereof, from passing and collecting in the rheostat carrying casing with the possible ignition of the same by an arc created as the contact finger is moved to and fro along the coil. For this purpose the journalled box or bearing is constructed of a tubular member or sleeve 42 having a reduced extended end engaged in an opening axially in the casing member 10 and secured therein by turning over the extended portion of said reduced end, as shown at 43. The bore in the bearing member is of greater diameter than the diameter of the stem 33, the stem being rotatably mounted in bushings 44 secured in opposite ends of the sleeve bore forming a pocket in the sleeve or bearing member 42 about the stem in which is contained a liquid material substance, such as mercury, as shown at 45. An annular portion about the stem and bearing for contact by said substance is made of a material, such as brass, for which said substance has a natural affinity or attraction and amalgamates therewith, thus forming a hermetical seal for the bearing preventing any passage of gasolene or the vapors thereof into the casing, and due to the fluidity of said substance it does not impede the rotation of the stem. As shown in Figure 1 the sleeve 42 is made of brass, for which the sealing liquid has a natural affinity, while the bushings and stem are made of a material, such as iron for which the liquid metallic substance has no affinity. The one end of the stem is reduced in diameter and a brass ring 46 of small area is mounted thereon between the shoulder formed by the reduced end and a sleeve of iron 47 engaged on the reduced end of the stem. The ring 46 is the annular portion of the stem having a natural affinity or attraction for the sealing liquid and thus presenting only a small portion or area for amalgamation therewith by the sealing liquid and offering a slight resistance to the rotation of the shaft while at the same time maintaining an impervious seal.

As stated the casing in which the rheostat or electric current flow regulating device is mounted is adapted to be mounted in relation to an opening in a tank containing the liquid to be measured with the float actuated shaft 34 to extend from the top to the bottom of the tank. In the use of the device in connection with the gasolene tank of a motor vehicle the gasolene is sloshed and surged about in the tank due to the movement of the vehicle thus constantly changing the liquid level, and as the float rises and falls with such changes in the liquid level corresponding variations are affected in the current flow and the actuation of the indicating instrument with the result that it is impossible to procure an accurate indication from the instrument as to the quantity of gasolene in the tank. For this purpose an auxiliary gasolene carrying chamber in which the float is arranged is provided, and comprising an open end tubular rectacle 48 of reduced area connected at the open end to the casing carrier 13 by engaging the same therein, as at 49, and releasably secured therein in a suitable manner, whereby the casing serves as a closure for the open end of the receptacle and to suspend the receptacle to extend from the top to the bottom of the tank and adapted to be removed as a unit with the casing. The receptacle is in liquid communication with the tank through a restricted port or ports 50 adjacent the bottom for the slow passage of the liquid into and from the receptacle whereby the liquid level in said receptacle will be the mean liquid level in the tank. To relieve the float of any air pressure thereon in the receptacle due to the entrance of liquid through the restricted ports 50 one or more air relief ports 51 are arranged at the top of the receptacle in communication with the tank above the liquid level. The guides 40 for the float are arranged in the receptacle by constructing the receptacle of a pair of sheets formed to semi-circular shape with the longitudinal marginal portions flanged inwardly with the flanges of one sheet bent reversely to hook form to be engaged over the flange of the other sheet to form a connecting seam, as shown at 52.

Figure 6:
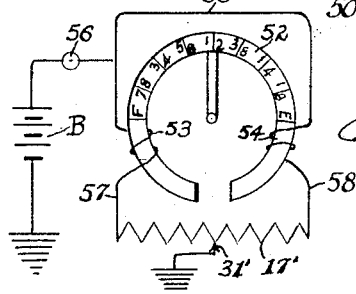
Figure 6 is a view showing in a diagrammatic manner the electric hook up of the current flow regulating means with an indicating instrument.

While the foregoing described electric current flow regulating means may be used in connection with various forms of indicating instruments it is particularly adapted for use in connection with an indicating instrument as disclosed in my co-pending application Serial No. 723,241, to which reference may be had, and I have shown in Figure 6 in a diagrammatic manner the electrical hook up of such an instrument with the current flow regulating means of the present invention. In said instrument the indicator is in the form of a drum arranged with calibrations about the periphery to indicate the quantity of liquid either by measure, as in gallons, or by the position of the liquid level in the tank, is carried by a pivotally supported magnetizable member of ring form 52, on which the calibrations indicative of the liquid level in the tank has been shown for convenience. The magnetizable ring is moved and positioned under the influence of opposed magnetic forces acting thereon generated by a pair of coils 53, 54 one terminal of each of which coils is connected by a conductor 55 with a source of electricity, such as a battery shown in a conventional manner at B, the negative side of which battery is grounded in the vehicle frame. The conductor may have a normally open switch interposed therein to be closed by a push button 56. The other terminals 57, 58 of the coils are connected to the opposite ends of the resistance element 17, shown in a conventional manner at 17' through the binding posts 28. The contact 31 indicated at 31' is connected in circuit with the resistance element and source of electricity by grounding in the vehicle frame as shown in a conventional manner in Figure 6, and in practice is connected to the battery by grounding through the casing and the tank in the vehicle frame. By this arrangement as a portion of the resistance element is connected in one coil, say the coil 53, a corresponding amount of the resistance will be cut out of the coil 54, and vice versa, thereby proportionally increasing and decreasing the values of the magnetic forces generated by the coils and influencing the ring 52 to move the same. In some instances, one coil as the coil 53 may be directly connected with the source of electricity whereby the value of the magnetic force generated by said coil will be constant and variations only effected in the value of the magnetic force generated by the coil 54 through the resistance device. In this arrangement the one terminal of the coil 53 as well as one terminal of the resistance element is grounded.

While I have described and illustrated one embodiment of my invention it is obvious that various modifications may be made in the construction and arrangement of parts, and that portions of the invention may be used without others, and come within the scope of the invention.

Having thus described my invention, I claim;

1. In means for controlling electric indicators to indicate the quantity of liquid in a tank, a casing, an electric resistance coil in the casing, a bearing member mounted in the wall of the casing centrally of the coil, a stem carrying a contact making finger to co-operate with the coil, bushings for mounting said stem in the bearing member and arranged to provide a pocket in the bearing member about the stem, mercury carried in said pocket, and a ring on said stem said ring and bearing member being made of brass and exposed to the mercury in the bearing pocket for the purpose specified.

2. In means for controlling electric indicators to indicate the quantity of liquid in a tank, a rheostat device embodying a casing comprising a pair of laterally flanged cup members arranged with the flanges in contiguous relation and the open ends of the cup members in opposed relation and a flanged ring having the flange bent over the marginal portions of the contiguous flanges of the cup members to secure said members together, said ring arranged for mounting the casing in and closing an opening to the tank, a circularly arranged resistance coil mounted in and insulated from the casing, a contact carrying shaft, a bearing member mounted in the casing, and bushings for rotatably mounting the contact carrying shaft in said bearing, said bushings and bearing being arranged to provide a pocket in the bearing.

3. Means as claimed in claim 2, wherein one cup member is arranged with two different diameters and the coil and contact carrying shaft is mounted in the cup member of one diameter, and contact terminals mounted in openings in the portion of the one cup member of smallest diameter and insulated therefrom and adapted for connection of the terminals of the coil within the casing and for connection of electric conductors exterior of the casing.

4. In means for controlling electric indicators to indicate the quantity of liquid in a tank, a casing comprising a pair of cup members connected with the open ends in opposed relation, a ring arranged to secure the cup members together and for mounting in an opening in the tank, a resistance coil mounted in and insulated from the casing, an open end receptacle connected at the open end to and supported by the casing member securing and mounting ring to form a unitary structure with the casing, a shaft having one end rotatably mounted in and extended into the casing centrally of the coil and carrying a contact making finger to co-operate with the coil and rotatably supported at the opposite end in the bottom of the receptacle, a float having a central core whereby it is mounted on the shaft to have movement longitudinally thereof within the receptacle and held against rotation, and an operative connection between the float and shaft to transmit the movement of the float on the shaft to rotary movement of the shaft.

Signed at the city of New York, in the county and State of New York, this 21st day of August, 1925.

MERION J. HUGGINS.